United States Patent [19]
Böhm

[11] 4,346,782
[45] Aug. 31, 1982

[54] METHOD OF PRODUCING AN IMPROVED VIBRATION DAMPING AND SOUND ABSORBING COATING ON A RIGID SUBSTRATE

[76] Inventor: Robert Böhm, Schillerstr. 26, 6901 Wiesenbach, Fed. Rep. of Germany

[21] Appl. No.: 239,848

[22] Filed: Mar. 2, 1981

Related U.S. Application Data

[63] Continuation of Ser. No. 100,162, Dec. 4, 1979, abandoned.

[30] Foreign Application Priority Data

Dec. 7, 1978 [DE] Fed. Rep. of Germany ....... 2852828

[51] Int. Cl.³ ......................... E04B 1/82; C04B 43/00

[52] U.S. Cl. .................................... 181/207; 181/208; 181/291; 181/294; 181/296; 427/409; 427/407.1

[58] Field of Search ............... 181/291, 294, 296, 208; 427/407.1, 409

[56] References Cited

U.S. PATENT DOCUMENTS 3,087,573 4/1963 Ross .................................... 181/208
3,658,635 4/1972 Eustice ................................ 181/290
3,833,404 9/1974 Sperling .............................. 427/333

FOREIGN PATENT DOCUMENTS 54-21842 9/1979 Japan .................................. 427/409

OTHER PUBLICATIONS

Damping of Flexural Waves by a Constrained Viscoelastic Layer, vol. 31, No. 7, Jul. 1959, JOASA.

*Primary Examiner*—Sam Silverberg
*Attorney, Agent, or Firm*—William L. Baker; David L. Weinstein

[57] ABSTRACT

A novel method of producing a vibration damping and sound absorbing coating on a rigid substrate is provided in which method a first coating of a viscoelastic material having after gelling a modulus of elasticity of $5\times10^6$ to $5\times10^8$ dynes/cm$^2$ is sprayed onto the substrate whereafter there is sprayed onto said first coating a second coating of a viscoelastic material having after gelling a modulus of elasticity of $5\times10^7$ to $5\times10^9$ dynes/cm$^2$, the modulus of elasticity of said second outer coating being at least 10 times greater than that of said first coating.

16 Claims, 4 Drawing Figures

METHOD OF PRODUCING AN IMPROVED VIBRATION DAMPING AND SOUND ABSORBING COATING ON A RIGID SUBSTRATE

This is a continuation, of application Ser. No. 100,162, filed Dec. 4, 1979 now abandoned.

BACKGROUND OF INVENTION

Due to their inadequate damping elastic structures, such as for example thin metal sheets used for vehicle bodies or machine casings, emit airborne sound of different frequencies if excited by airborne sound or by structure-borne vibrations.

Hitherto, this mainly low frequency noise, especially in the range 100 to 1000 cps has been deadened by applying damping materials. Suitable materials for this purpose are viscoelastic damping foils based on bitumen and/or filled synthetic resins, as well as bituminous felts with and without additional damping coverings. The bitumen foils which are at present mainly used in the manufacture of vehicles and which are placed on the floor inside of the vehicle must have a high weight per unit area in order to bring about an effective vibration damping. Generally, the weight is approximately 4 to 7 kg/m$^2$. However, this results only in a sound loss factor of approximately 0.1 to 0.2. In addition, such high weights are particularly disadvantageous in vehicle building.

Materials which can be applied by spraying are also known. These are the known coatings for underbody protection of motor vehicles having a synthetic resin and/or bitumen base and which solidify to give resilient coatings of low or high bending resistance. However, these materials are mainly intended to provide good corrosion protection and high abrasion resistance. Their vibration and sound damping properties are so poor that they are inadequate without the use of the abovementioned foils inside the vehicle. Thus, conventional underbody protection materials based on filled PVC plastisols provide only a loss factor of approximately 0.02 at ambient temperature and 200 cps at a coating weight of 3 kg/m$^2$.

It is known that sound insulation can be improved if a sandwich-like covering is formed on the sound radiating and transmitting substrate, for example a metal sheet, in such a way that a layer of resilient material, e.g. a foam material is applied to the substrate, followed by the applying thereon a layer of a material with high bending resistance and high specific gravity. Such structures are for example known from German Auslegeschrift No. 2,064,445 and although they provide considerable improvements with regard to sound insulation, they are not suitable for vibration damping and sound absorption.

U.S. Pat. No. 3,833,404 discloses vibration damping and sound-abosorbing structures formed from two layers of which the inner layer comprises a viscoelastic mixture of elastomeric and thermoplastic polymers with a modulus of elasticity of below $1\times10^{10}$ dynes/cm$^2$, while the outer layer comprises a rigid plastic material with a modulus of elasticity of above $1\times10^{10}$ dynes/cm$^2$. Due to the high rigidity of the outer layer, which may be obtained by adding reinforcing fibres, the structure thus formed is similar to a conventional sandwich system in which a viscoelastic layer is positioned between two rigid materials such as metal, wood or the like.

It is the object of the present invention to provide a process of producing sound and vibration damping coatings in which process conventional materials are applied in a simple manner, i.e. more particularly by spraying, and which process yields coatings fulfilling all requirements relative to corrosion and abrasion protection and simultaneously providing good damping agent structure-borne vibrations and good sound absorption at relatively low weights per unit area.

SUMMARY OF INVENTION

It has surprisingly been found that this problem can be solved if two layers are applied, whose moduli of elasticity after gelling or curing are within a defined range and which in each case differ from each other by at least the factor 10.

The invention therefore relates to a method of producing a structure-borne vibration and sound damping and at the same time corrosion and abrasion resistant coating on a rigid substrate in which successively two coating materials with different moduli of elasticity are applied to the substrate. This method is improved in that a first coating of a viscoelastic material is sprayed onto the substrate having after gelling and/or curing a modulus of elasticity of $5\times10^6$ to $5\times10^8$ dynes/cm$^2$ and in that onto said first coating there is sprayed a second coating of a viscoelastic material which after gelling and/or curing has a modulus of elasticity of $5\times10^7$ to $5\times10^9$ dynes/cm$^2$, the modulus of elasticity of said second outer coating being at least 10 times greater than that of said first coating.

Preferably the coating materials are selected in such a way that the modulus of elasticity of the second outer layer is 40 to 100 times greater than that of the first inner layer.

It has surprisingly been found that contrary to the "constrained layer" theories upon which U.S. Pat. No. 3,833,404 is also based, it is not necessary for obtaining good structure-borne vibration damping and sound absorption to produce a surface layer with a modulus of elasticity above $10^{10}$ dynes/cm$^2$, which poses serious practical difficulties and requires the use of special reinforced materials. It has in fact been found quite unexpectedly that high loss factors of approximately 0.1 to 0.3 within the relevant temperature range of approximately $-20°$ to $+50°$ C. are obtained if, in accordance with the invention, two materials are sprayed onto the substrate and are subsequently gelled, whose moduli of elasticity differ from one another by at least a power of ten. Coating weights of approximately 10 to 70, more particularly 20 to 60% of the substrate weight are sufficient to obtain these loss factors. These figures relate to measurement at 200 cps, but similar values are also obtained at other frequencies in the physiologically particularly important frequency range of approximately 20 to 1000 cps.

DETAILED DESCRIPTION OF INVENTION

Materials already known per se for corrosion and abrasion protection, such as for example those used for the underbody protection of motor vehicles are suitable for producing the coatings according to the invention. These are mainly plastisols based on polyvinyl chloride homopolymers or copolymers, e.g. with vinylidene chloride. Plastisols made from acrylic homopolymers or copolymers, such as those recently disclosed in German Auslegeschriften Nos. 2,454,235 and 2,529,732 are also very suitable. Polyamine epoxides are also usable.

In order to adjust the moduli of elasticity of the materials for the two layers, plasticizers can be used in a manner known per se. The greater the plasticizing effect and the larger the quantity of plasticizer added, the greater the drop in the modulus of elasticity of a given material. The modulus of elasticity can also be reduced by converting the material into a foam material, e.g. a by adding a foaming agent which is activated during gelling. The mechanical properties, particularly the abrasion resistance, can be improved by adding fillers in a manner known per se.

Contrary to the known methods (cf e.g. U.S. Pat. No. 3,833,404) it is possible in the process according to the invention to use materials with the same chemical base, e.g. two PVC plastisols, for the two layers, provided that their moduli of elasticity differ sufficiently. Due to the complete compatibility of the materials this leads to an excellent adhesion between the layers and it is possible without difficulty to successively apply both layers by spraying and then jointly gel them by heating. The coating has the abrasion and corrosion resisting properties of a conventional underbody protective coatings made from polyvinyl chloride, but is approximately 10 times superior to the latter with regard to the sound loss factor for the same weight per unit area (a loss factor of only about 0.02 is obtained under otherwise identical conditions with conventional underbody protection materials).

It is also possible for the first inner layer to be a material with a lower abrasion resistance, for example one of the above-mentioned acrylic polymer based plastisols, having the additional advantage that as a result of their freedom from chlorine they give steel sheets a particularly effective corrosion protection. A second layer of a filled PVC plastisol with a higher modulus of elasticity and excellent abrasion resistance can then be applied to the first layer. It has also been found that the impact resistance of the coating is significantly improved compared with conventional coverings due to the softer layer underneath. The weight of the coating can be approximately 10 to 70, preferably approximately 20 to 60% of the substrate weight. The total layer thickness is normally about 1 to 20 mm, dependent on the desired coating weight, which generally varies between approximately 1 and 5 kg/m$^2$, preferably between 2 and 4 kg/m$^2$. The first inner layer of the coating can represent 10 to 80%, preferably 10 to 40% of the total layer thickness.

The attached drawings and the following examples will serve to further illustrate the invention.

Figure 3:
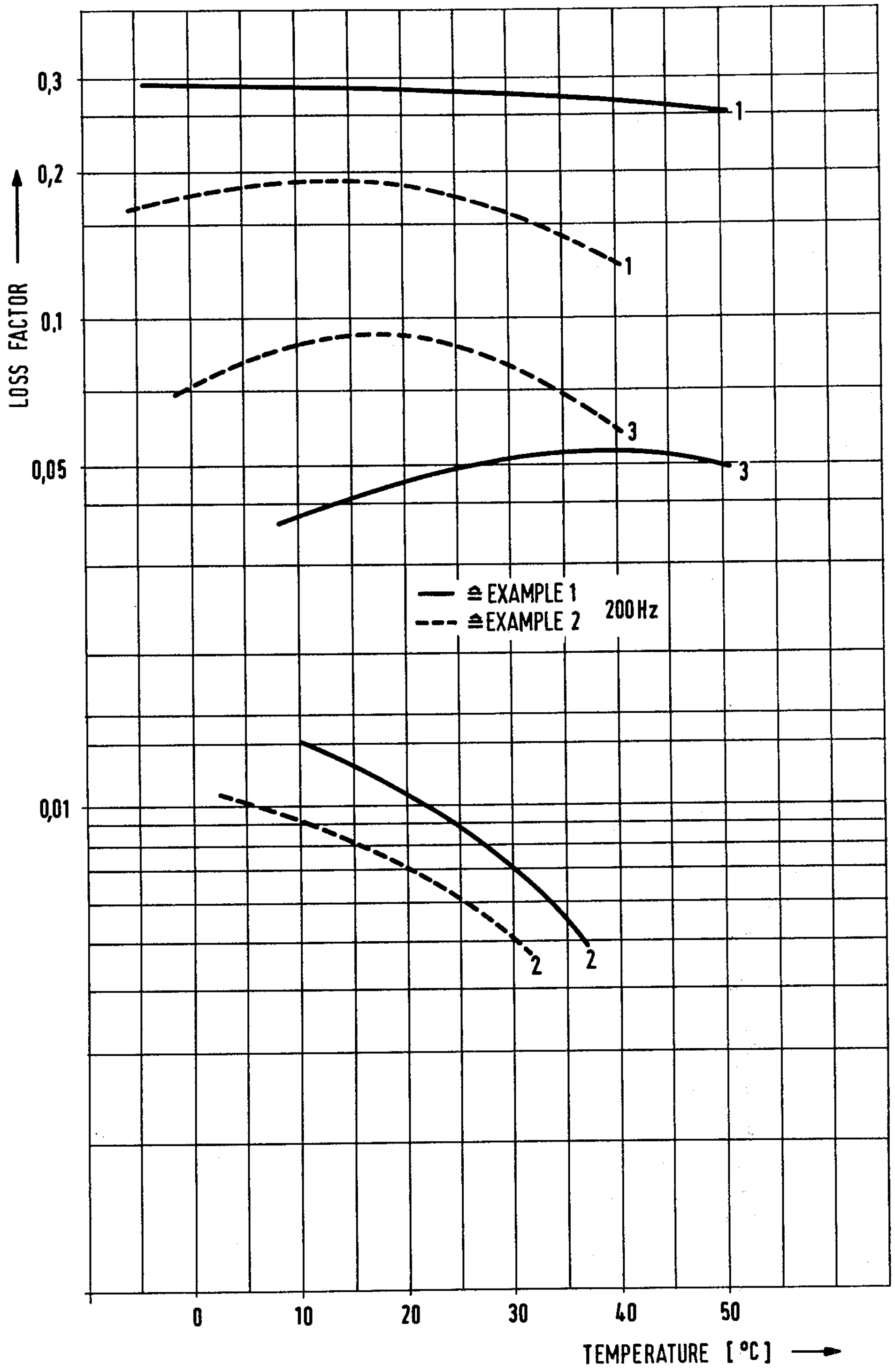

FIG. 3 is a graph showing the dependence of the loss factor on the temperature (measured at 200 cps) for the coatings of the following examples 1 (continuous curves) and 2 (dotted-line curves). Curve 1 corresponds to the coating according to the invention, curve 2 to a coating made from the material of the softer intermediate layer and curve 3 to a coating made from the harder outer layer (with idential coating weight in each case). The superiority of the coatings according to the invention is particularly apparent.

Figure 4:
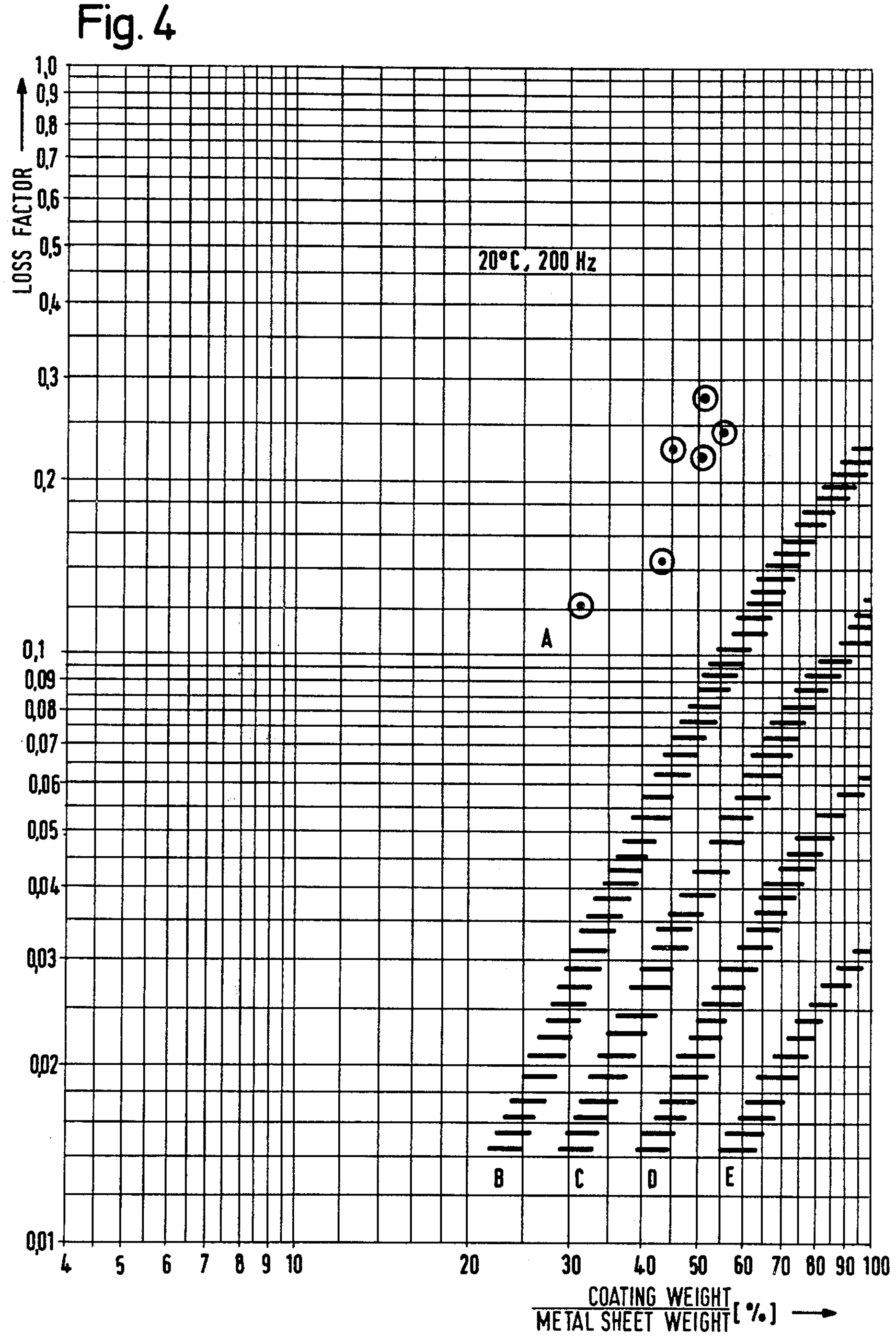

FIG. 4 is a graph showing the dependence of the loss factor on the coating weight as a percentage of the sheet metal weight (measured in each case at 20° C. and 200 cps). The measuring points A were obtained for six coatings according to the invention. Area C corresponds to a harder PVC, area E to a softer PVC, in each case when used alone. Areas B and D were correspondingly obtained for hard and soft materials based on acrylic polymer plastisols. Here again, the superior sound absorbing and vibration damping properties of the coatings according to the invention are apparent.

EXAMPLE 1

The coating material for the first inner layer comprised 20% by weight of a methyl methacrylate/butyl methacrylate copolymer, 50% by weight of aryl alkyl sulphonate, 27% by weight of chalk (filler) and 3% by weight of azodicarbonamide (foaming agent). This composition was sprayed onto a metal sheet and for gelling and foaming heated for 30 minutes at 170° C.

A composition comprising 20% by weight of polyvinyl chloride, 7% by weight of monomeric dimethacrylate, 20% by weight of dioctyl phthalate, 10% by weight of dibutyl phthalate, 43% by weight of chalk and 0.7% by weight of butyl perbenzoate was used for the second outer layer. This layer was also heated for 30 minutes at 170° C. after spraying.

The two layers were applied in a layer thickness ratio of 1:3, the coating weight amounting to 57% of the sheet metal weight.

The modulus of elasticity of the first layer was $6\times10^7$ dynes/cm$^2$ and that of the second layer $4\times10^9$ dynes/cm$^2$.

Figure 1:
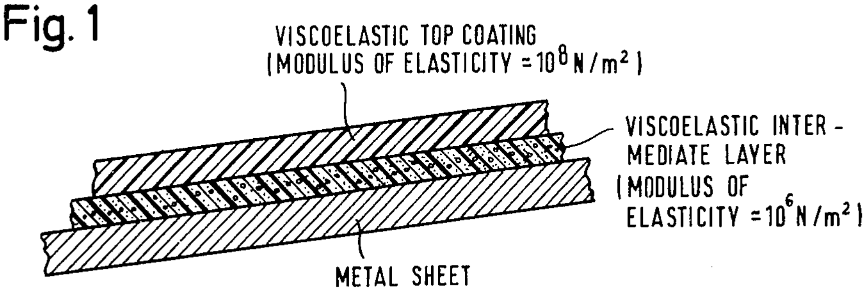
FIG. 1 shows a cross section of a coating according to the invention on a sheet metal substrate, comprising a viscoelastic softer intermediate layer and a viscoelastic harder outer layer.
Figure 2:
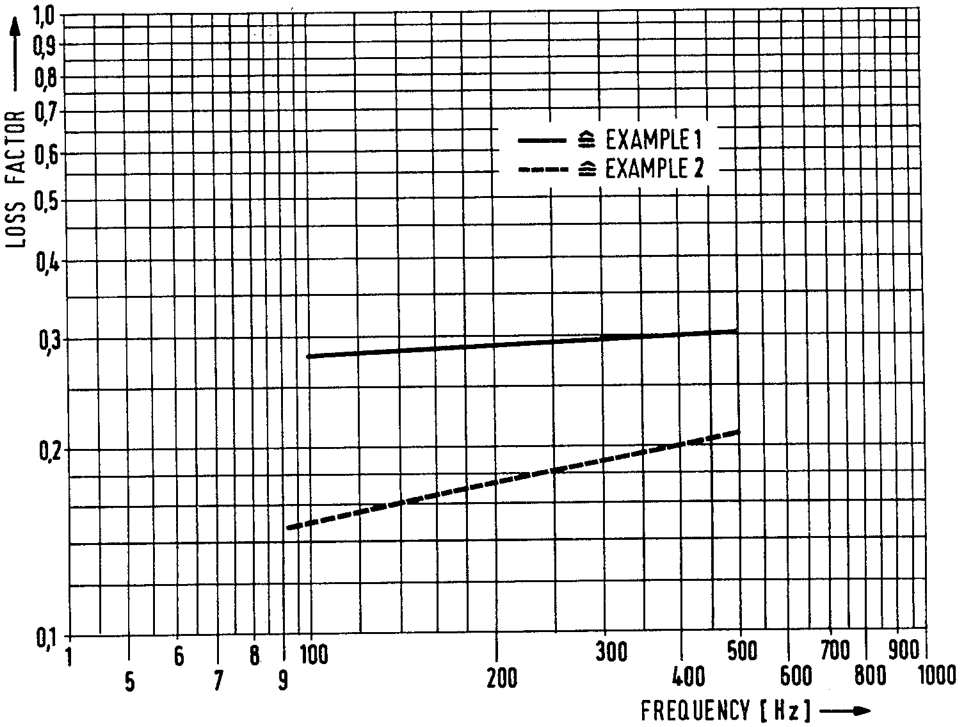
FIG. 2 is a graph showing the dependence of the loss factor on the frequency for coatings produced according to the following examples 1 and 2 of the invention.

FIGS. 2 and 3 show the loss factors obtained with this coating as a function of the frequency and the temperature, respectively.

EXAMPLE 2

The same composition as in example 1 was used for the first inner layer.

A composition of 30% by weight of a methyl methacrylate/butyl methacrylate copolymer, 32.8% by weight of aryl alkyl sulphonate, 32% by weight of chalk, 54% by weight of naphtha and 0.2% by weight of perylene tetracarboxylic acid was used for the second outer layer. Gelling took place within 30 minutes at 170° C.

The two layers were applied in a layer thickness ratio of 1:4, the coating weight amounting to 54% of the substrate weight. The modulus of elasticity of the first layer was $6\times10^7$ dynes/cm$^2$ and that of the second layer $1\times10^9$ dynes/cm$^2$.

FIGS. 2 and 3 show the loss factors for the coating as a function of the frequency and the temperature, respectively.

I claim:

1. A method of producing a vibration and sound damping and at the same time corrosion and abrasion resistant coating on a rigid substrate in which method two coating materials with different moduli of elasticity are successively applied to the substrate, characterized in that a first coating of a viscoelastic material is sprayed onto the substrate having after gelling and/or curing a modulus of elasticity of $5\times10^6$ to $5\times10^8$ dynes/cm$^2$ and that onto said first coating there is sprayed a second coating of a viscoelastic material which after gelling and/or curing has a modulus of elasticity of $5\times10^7$ to $5\times10^9$ dynes/cm$^2$, the modulus of elasticity of said second outer coating being at least 10 times greater than that of said first coating.

2. The method of claim 1, characterized in that the coating materials are selected in such a way that the modulus of elasticity of the second outer coating is 40 to 100 times greater than that of the first inner coating.

3. The method according to any one of the claims 1 or 2 characterized in that the first inner coating represents 10 to 80% of the total thickness of the coating.

4. The method according to claim 3, characterized in that the first inner coating represents 10 to 80% of the total thickness of the coating.

5. The method of any one of the claims 1 or 2, characterized in that plastisols based on a polymer selected from the group of vinyl chloride homopolymers, vinyl chloride copolymers, acrylic homopolymers, acrylic copolymers, and liquid polyamide epoxide are used for the coatings, the modulus of elasticity thereof being adjusted by the addition of plasticizers or foaming agents or mixtures thereof.

6. The method according to claim 3, characterized in that plastisols based on a polymer selected from the group of vinyl chloride homopolymers, vinyl chloride copolymers, acrylic homopolymers, acrylic copolymers, and liquid polyamide epoxide are used for the coatings, the modulus of elasticity thereof being adjusted by the addition of plasticizers or foaming agents or mixtures thereof.

7. The method according to claim 3, characterized in that plastisols based on a polymer selected from the group of vinyl chloride homopolymers, vinyl chloride copolymers, acrylic homopolymers, acrylic copolymers, and liquid polyamide epoxide are used for the coatings, the modulus of elasticity thereof being adjusted by the addition of plasticizers or foaming agents or mixtures thereof.

8. The method according to claim 4, characterized in that plastisols based on a polymer selected from the group of vinyl chloride homopolymers, vinyl chloride copolymers, acrylic homopolymers, acrylic copolymers, and liquid polyamide epoxide are used for the coatings, the modulus of elasticity thereof being adjusted by the addition of plasticizers or foaming agents or mixtures thereof.

9. A vibration and sound damping coating whenever prepared by the method of claim 1 or 2.

10. A vibration and sound damping coating whenever prepared by the method of claim 3.

11. A vibration and sound damping coating whenever prepared by the method of claim 3.

12. A vibration and sound damping coating whenever prepared by the method of claim 4.

13. A vibration and sound damping coating whenever prepared by the method of claim 5.

14. A vibration and sound damping coating whenever prepared by the method of claim 6.

15. A vibration and sound damping coating whenever prepared by the method of claim 7.

16. A vibration and sound damping coating whenever prepared by the method of claim 8.

* * * * *